US012553233B2

(12) United States Patent
Benvenuto et al.

(10) Patent No.: US 12,553,233 B2
(45) Date of Patent: Feb. 17, 2026

(54) SYSTEM FOR FABRICATING A STRUCTURE AND A FLOORPLATE LIFTING SYSTEM

(71) Applicant: BIG TIME INVESTMENT, LLC, Southfield, MI (US)

(72) Inventors: Joseph Michael Benvenuto, Monroe, MI (US); Stephen T. Houston, Timnath, CO (US); Bridget C. Joseph, Bloomfield Hills, MI (US); Dana Burzo, Winter Garden, FL (US); Ryan M. Ramirez, South Lyon, MI (US); Brendan J. Madigan, Grosse Pointe Woods, MI (US)

(73) Assignee: BIG TIME INVESTMENT, LLC, Southfield, MI (US)

( * ) Notice: Subject to any disclaimer, the term of this patent is extended or adjusted under 35 U.S.C. 154(b) by 211 days.

(21) Appl. No.: 18/429,545

(22) Filed: Feb. 1, 2024

(65) Prior Publication Data

US 2025/0250788 A1 Aug. 7, 2025

(51) Int. Cl.
*E04B 1/35* (2006.01)
*B66F 3/46* (2006.01)

(52) U.S. Cl.
CPC .............. *E04B 1/3516* (2013.01); *B66F 3/46* (2013.01); *E04B 2001/3588* (2013.01)

(58) Field of Classification Search
CPC ... E04B 1/3516; E04B 2001/3588; B66F 3/46
See application file for complete search history.

(56) References Cited

U.S. PATENT DOCUMENTS 3,260,028 A * 7/1966 Lee ........................ E04B 1/3404 52/125.1
3,686,816 A * 8/1972 Erbil ..................... E04B 1/3404 52/83
3,692,446 A * 9/1972 Vanderklaauw ...... E04B 1/3511 425/63
3,729,878 A * 5/1973 Termohlen ............ E04B 1/3511 52/235
3,822,522 A * 7/1974 Termohlen ................ E04B 2/90 52/235
3,831,902 A * 8/1974 Vanderklaauw ...... E04B 1/3505 254/105

(Continued)

FOREIGN PATENT DOCUMENTS

CZ 20033282 A3 7/2005
GB 1476417 A 6/1977

*Primary Examiner* — Rodney Mintz

(74) *Attorney, Agent, or Firm* — Howard & Howard Attorneys PLLC

(57) ABSTRACT

A floorplate lifting system includes a lift bridle and a lift system. The lift system includes a plurality of strand jacks, a plurality of static strand bundles, a plurality of strand anchors, and a plurality of strand mounting brackets. The plurality of strand mounting brackets are detachably affixed to a vertical support core. First ends of the plurality of static strand bundles are attached to the plurality of strand anchors, and the plurality of static strand bundles are suspended from the plurality of strand mounting brackets via the plurality of strand anchors. Second ends of the plurality of static strand bundles are suspended from the plurality of strand jacks. The strand jacks are attachable to the lift bridle.

19 Claims, 8 Drawing Sheets

(56) References Cited

U.S. PATENT DOCUMENTS

| | | | | | |
|---|---|---|---|---|---|
| 3,895,473 | A * | 7/1975 | Fraser | E04B 1/3404 | 52/125.1 |
| 3,981,109 | A * | 9/1976 | Termohlen | E04B 1/3404 | 52/283 |
| 4,050,214 | A * | 9/1977 | Johnson | E04H 5/12 | 261/DIG. 11 |
| 4,071,988 | A | 2/1978 | Bowes | | |
| 4,206,162 | A * | 6/1980 | Vanderklaauw | E04B 1/3511 | 264/33 |
| 4,251,974 | A * | 2/1981 | Vanderklaauw | E04B 1/3511 | 52/125.1 |
| 4,301,630 | A * | 11/1981 | Burkland | E04B 1/3511 | 52/125.1 |
| 4,611,784 | A * | 9/1986 | Gallis | E04G 11/28 | 249/20 |
| 7,784,231 | B2 * | 8/2010 | Termohlen | E04B 1/3516 | 52/79.14 |
| 9,752,316 | B2 * | 9/2017 | Thornton | E04B 1/16 | |
| 10,214,927 | B2 * | 2/2019 | Jenner | E04B 1/3522 | |
| 10,704,253 | B1 * | 7/2020 | Houston | E04B 1/3511 | |
| 10,745,906 | B1 | 8/2020 | Houston et al. | | |
| 10,753,080 | B1 | 8/2020 | Houston et al. | | |
| 10,829,927 | B2 * | 11/2020 | Houston | E04B 1/3404 | |
| 10,829,928 | B2 | 11/2020 | Houston et al. | | |
| 10,900,218 | B2 | 1/2021 | Houston et al. | | |
| 11,066,826 | B2 * | 7/2021 | Wright | G06F 3/0488 | |
| 11,274,432 | B2 * | 3/2022 | Houston | E04B 1/3544 | |
| 11,286,660 | B2 * | 3/2022 | Houston | E04B 1/3516 | |
| 11,473,295 | B2 * | 10/2022 | Houston | E04B 1/3516 | |
| 11,680,399 | B2 | 6/2023 | Houston et al. | | |
| 11,913,242 | B2 * | 2/2024 | Benvenuto | E04B 1/3516 | |
| 12,012,745 | B2 * | 6/2024 | Houston | E04B 1/2403 | |
| 12,352,058 | B2 * | 7/2025 | Benvenuto | E04B 1/3544 | |
| 2008/0276550 | A1 * | 11/2008 | Termohlen | E04B 1/3516 | 52/169.9 |
| 2009/0049762 | A1 * | 2/2009 | Termohlen | E04G 11/22 | 52/79.14 |
| 2016/0010349 | A1 * | 1/2016 | Jenner | E04G 21/163 | 254/338 |
| 2017/0089062 | A1 * | 3/2017 | Thornton | E04B 1/4114 | |
| 2020/0080297 | A1 | 3/2020 | Wright | | |
| 2020/0284026 | A1 * | 9/2020 | Houston | E04B 1/3404 | |
| 2020/0308822 | A1 * | 10/2020 | Houston | E04B 1/3511 | |
| 2020/0340234 | A1 * | 10/2020 | Houston | E04B 5/40 | |
| 2020/0385981 | A1 * | 12/2020 | Houston | E04B 1/3516 | |
| 2020/0399890 | A1 * | 12/2020 | Houston | E04B 1/3511 | |
| 2021/0102367 | A1 * | 4/2021 | Houston | E04B 5/40 | |
| 2022/0333368 | A1 * | 10/2022 | Houston | E04B 1/2403 | |
| 2022/0333388 | A1 * | 10/2022 | Benvenuto | E04B 1/3544 | |
| 2023/0265646 | A1 * | 8/2023 | Houston | E04B 1/3544 | 52/838 |
| 2024/0167291 | A1 * | 5/2024 | Benvenuto | E04G 5/007 | |

* cited by examiner

SYSTEM FOR FABRICATING A STRUCTURE AND A FLOORPLATE LIFTING SYSTEM

TECHNICAL FIELD

The disclosure generally relates to a method, apparatus, and system for fabricating a structure.

BACKGROUND

Various methods are employed to fabricate and construct multi-story buildings. Traditionally, multi-story buildings have been constructed from the ground up, in which construction of the building begins on a ground level by attaching higher elevation structural elements on top of previously assembled lower structural elements to construct the building in upward direction, i.e., from bottom up. Such methods may be inefficient in terms of material handling and placement. Presently, structural framing elements may be assembled into a building frame one member at a time and above ground level. Tower cranes are used during construction to execute thousands of individual lifts for elements of the structure, building enclosure, finishes, mechanical and electrical equipment and many other components of a finished building. Furthermore, concrete or another hardenable material is pumped to the final elevation of each floor. These operations may require specialized equipment, setup logistics, and skilled operators, and may be time-consuming and labor-intensive.

There is a benefit to providing a building fabrication method and system, and an associated fabricated structure, that more effectively uses available material and labor resources.

There is a benefit in providing hardware elements and associated systems that facilitate building fabrication.

SUMMARY

The concepts set forth herein provide a floorplate lifting system for lifting or hoisting an assembled floorplate from an assembly level that is at or near ground level to a design level, during fabrication of a multi-story structure. In one embodiment, the multi-story structure may include a vertical support core and a plurality of cantilevered floorplates, wherein each floorplate is lifted to the design elevation on the vertical support core.

An aspect of the disclosure may include the floorplate lifting system including a lift bridle and a lift system, wherein floorplates are sequentially assembled onto the lift bridle and lifted on a vertical support core to their respective design elevations via the lift system. The lift system includes a plurality of strand jacks, a plurality of static strand bundles, a plurality of strand anchors, and a plurality of strand mounting brackets. The plurality of strand mounting brackets are detachably affixed to a vertical support core. First ends of the plurality of static strand bundles are removably attachable to the plurality of strand anchors, and the plurality of static strand bundles are suspended from the plurality of strand mounting brackets via the plurality of strand anchors. Second ends of the plurality of static strand bundles are suspended from the plurality of strand jacks. The plurality of strand jacks are attached to the lift bridle.

Another aspect of the disclosure may include each of the plurality of strand mounting brackets having an upper mounting portion, a lower mounting portion, a diagonal member, and a horizontally disposed strut. The upper mounting portion includes a vertically oriented T-beam having a first flange portion and a vertical web portion, wherein the web portion defines a first attachment aperture, and the lower mounting portion includes a horizontally oriented double T-beam having a second flange portion and first and second horizontal web portions. The strut is a first elongated bar having a first end and a second end, wherein the second end defines a second attachment aperture and a strand anchor attachment point, and wherein the first end is secured to the lower mounting portion. The diagonal member is a second elongated bar having a first end and a second end, wherein the first end is secured to the first attachment aperture of the upper mounting portion, and wherein the second end is secured to the second attachment aperture of the lower mounting portion. The strut is arranged between the first and second horizontal web portions of the lower mounting portion and is attached to the second flange portion of the lower mounting portion.

Another aspect of the disclosure may include the strut projecting from the lower mounting portion being arranged at an angle that is non-orthogonal to a vertically-oriented plane defined by the second flange portion of the lower mounting portion.

Another aspect of the disclosure may include the first flange portion of the upper mounting portion defining a plurality of first apertures capable of accommodating a plurality of securement fasteners.

Another aspect of the disclosure may include the first flange portion of the upper mounting portion being detachably affixed to the vertical support core employing the plurality of securement fasteners disposed in the plurality of first apertures.

Another aspect of the disclosure may include the second flange portion of the lower mounting portion defining a plurality of second apertures for accommodating a plurality of securement fasteners.

Another aspect of the disclosure may include the second flange portion of the lower mounting portion being detachably affixed to the vertical support core employing the plurality of securement fasteners disposed in the plurality of second apertures.

Another aspect of the disclosure may include the vertical support core being a plurality of vertical columns that are arranged on a base, wherein the plurality of vertical columns include a plurality of attachment points that are arranged on the plurality of vertical columns that project upwardly from the base.

Another aspect of the disclosure may include the plurality of strand mounting brackets being removably attachable to the plurality of vertical columns at respective attachment points that are arranged on the plurality of vertical columns that project upwardly from the base.

Another aspect of the disclosure may include the plurality of attachment points that are arranged on the plurality of vertical columns that project upwardly from the base including a first attachment point arranged at a top portion of each of the plurality of vertical columns of the vertical support core, a second attachment point arranged at a first intermediate portion of each of the plurality of vertical columns of the vertical support core, and a third attachment point arranged at a second intermediate portion of each of the plurality of vertical columns of the vertical support core.

Another aspect of the disclosure may include the lift bridle being slidably disposed on the vertical support core.

Another aspect of the disclosure may include a floorplate being assembled onto the lift bridle, wherein the floorplate is lifted into place on the vertical support core by actions of the plurality of strand jacks interacting with the plurality of static strand bundles.

Another aspect of the disclosure may include a floorplate lifting system having a lift bridle, and a lift system including a plurality of strand jacks, a plurality of static strand bundles, a plurality of strand anchors, and a plurality of strand mounting brackets. The plurality of strand mounting brackets are detachably affixed to a vertical support core. First ends of the plurality of static strand bundles are removably attachable to the plurality of strand anchors. The plurality of static strand bundles are suspended from the plurality of strand mounting brackets via the plurality of strand anchors. The plurality of strand jacks are suspended from second ends of the plurality of static strand bundles. The plurality of strand jacks are removably attachable to the lift bridle.

Another aspect of the disclosure may include a building fabrication system having a lift bridle arranged on a vertical support core having a plurality of vertical columns disposed on a base; and a lift system. The lift system includes a plurality of strand jacks, a plurality of static strand bundles, a plurality of strand anchors, and a plurality of strand mounting brackets. The plurality of strand mounting brackets are detachably affixed to the plurality of vertical columns. The plurality of static strand bundles includes first ends and second ends, wherein the first ends of the plurality of static strand bundles are removably attachable to the plurality of strand anchors, wherein the second ends of the plurality of static strand bundles are suspended from the plurality of strand jacks, and wherein the plurality of static strand bundles are suspended from the plurality of strand mounting brackets via the plurality of strand anchors. The plurality of strand jacks are attached to the lift bridle. A floorplate is assemblable on the lift bridle at a ground level, and the lift system is operable to lift the lift bridle on the plurality of static strand bundles to hoist the floorplate to a design level. The lift system is operable to drop the lift bridle the plurality of static strand bundles after the floorplate is secured to the vertical support core at the design level by operation of the strand jacks on the static strand bundles.

Another aspect of the disclosure may include the plurality of strand mounting brackets being detachably affixed to the plurality of vertical columns at one of a plurality of attachment points that are arranged along the plurality of vertical columns that project upwardly from the base. The plurality of attachment points includes a first attachment point arranged at top portions of the plurality of vertical columns of the vertical support core, a second attachment point arranged at a first intermediate portion of each of the plurality of vertical columns of the vertical support core, and a third attachment point arranged at a second intermediate portion of each of the plurality of vertical columns of the vertical support core.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

Figure 1A:
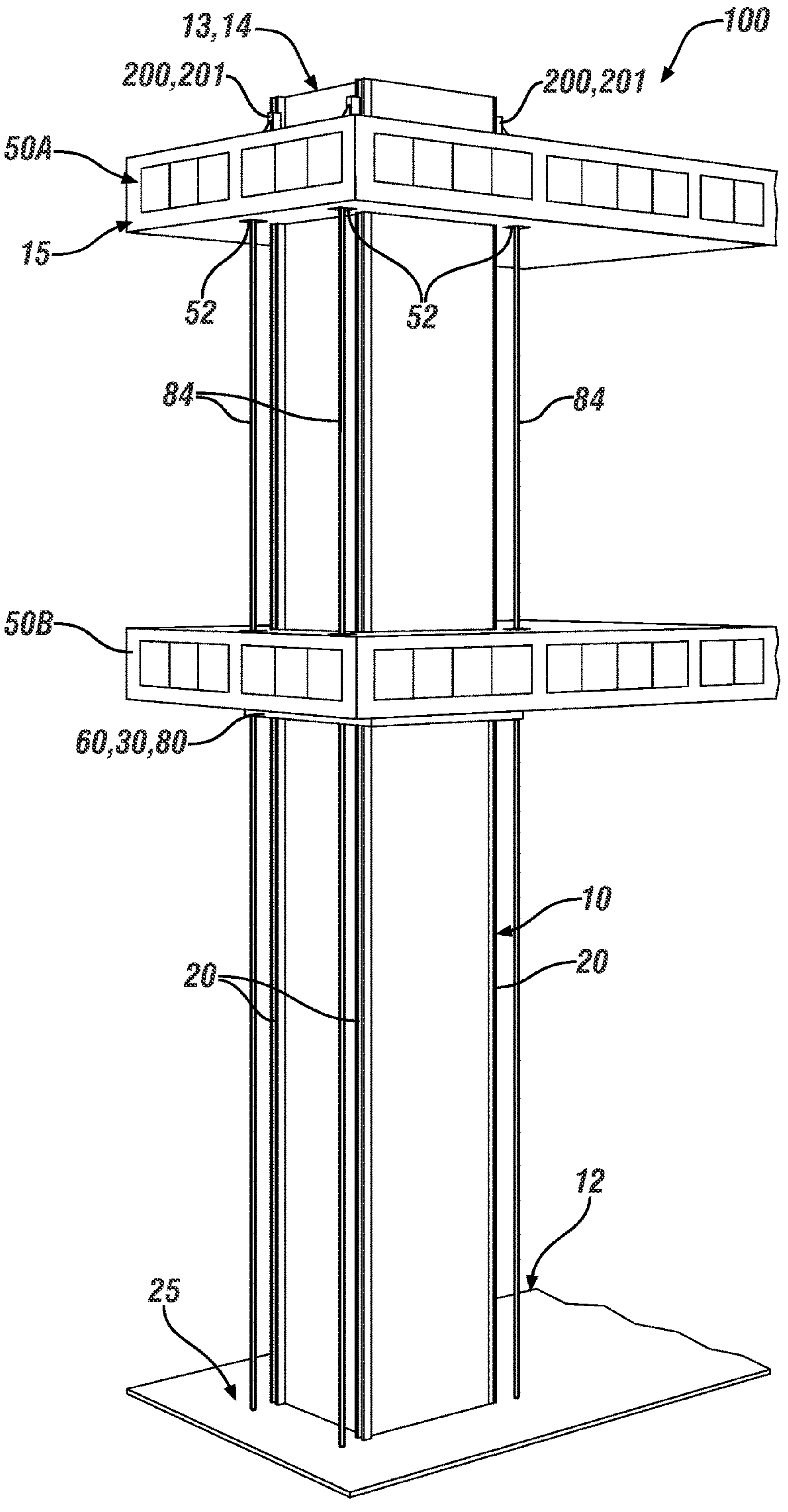
FIGS. 1A, 1B, 1C and 1D schematically illustrate aspects of a partially assembled multi-story structure having a vertical support core and a plurality of floorplates, and a building fabrication system that includes a lift bridle and a lift system including a plurality of strand mounting brackets that are detachably affixed to the vertical support core, in accordance with the disclosure.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure.

For purposes of convenience and clarity, directional terms such as top, bottom, left, right, up, over, above, below, beneath, rear, and front, may be used with respect to the drawings. These and similar directional terms are descriptive of the figures, and not to be construed to limit the scope of the disclosure. Furthermore, the disclosure, as illustrated and described herein, may be practiced in the absence of an element that is not specifically disclosed herein.

This disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

Furthermore, as used in the specification and the appended claims, the singular form "a," "an," and "the" may indicate single or plural referents unless the context clearly indicates otherwise. For example, reference to a component in the singular may include one or a plurality of the components.

The use of ordinals such as first, second and third does not necessarily imply a ranked sense of order, but rather may only distinguish between multiple instances of an act or structure.

When an element is described as being "fixed on" or "disposed on" another element, the element may be placed on another element directly or by using an intermediate element. When an element is considered as "connected to" or coupled to another element, the element may be connected to the other element directly or by using an intermediate element. As employed herein, terms such as "vertical", "horizontal", "left", "right", "upper", "lower", and similar expressions are non-limiting terms that merely describe the various elements as illustrated herein, and are not intended to limit the scope of the disclosure.

As used herein, the term "system" may refer to one of or a combination of mechanical and electrical devices in conjunction with actuators, sensors, controllers, logic circuits, software, firmware, and/or other components that are arranged to provide the described functionality.

Referring to the Figures, wherein like numerals indicate like parts throughout the several views, FIGS. 1A, 1B, 1C, and 1D schematically illustrate aspects of a partially assembled multi-story structure 100 having a plurality of floorplates 50, and a floorplate lifting system 60. The multi-story structure 100 includes a building spine that is composed of one or a plurality of vertical support core(s) 10 that are arranged on a base 12. The base 12 is disposed on a substratum of the ground to transfer and distribute the weight of the structure 100 thereto. A single vertical support core 10 is shown, but it is appreciated that there may be two or more vertical support cores 10, with each employing an embodiment of the floorplate lifting system 60 during building fabrication. Each floorplate lifting system 60 includes a lift system 80 and a lift bridle 30.

The concepts described herein apply, in one embodiment, to a top-down fabrication system for fabricating a multi-story structure, employing an embodiment of the floorplate lifting system 60. However, the concepts described herein also apply to other building fabrication systems and schemes, which are therefore included within the scope of the claims insofar as the concepts apply.

The top-down fabrication system and associated process include sequentially fabricating a plurality of floorplates 50 at an assembly level 25; lifting, via the floorplate lifting system 60, each of the floorplates 50 to the respective design elevation 15; and attaching each of the floorplates 50 to the vertical support core 10 of the structure 100 in a descending order.

As used herein, the term "floorplate" includes but is not limited to all structural or frame members, e.g., joists and/or purlins; flooring, e.g., concrete floor; interior walls; exterior curtain walls; modular room subassemblies; lavatories; mechanical building elements such as plumbing, electrical, and ventilation elements, etc., which may be assembled to form a floor or level of the structure 100. The plurality of floorplates 50 includes one floorplate that includes a roof structure of the structure 100, as well as a plurality of floorplates that form floors or levels of the structure 100. Accordingly, the term "floorplate" is used herein to refer to both the roof structure for the roof of the structure 100, as well as a floor structure for one of the floors or levels of the structure 100. The reference numeral 50 may refer to and indicate any floorplate 50 of the structure 100.

FIGS. 1A, 1B, 1C and 1D schematically illustrate aspects of a partially assembled multi-story structure 100 having a vertical support core 10, a plurality of floorplates 50 (individually indicated by letters A, B, C, etc.) and a building fabrication system that includes a floorplate lifting system 60 that is composed of lift system 80 and lift bridle 30.

As illustrated with reference to each of FIGS. 1A, 1B, 1C and 1D, floorplate 50A is an uppermost floorplate, and is shown arranged at its design level 15, i.e., final level 15 after having been lifted into place via the floorplate lifting system 60, and affixed to the vertical support core 10. Floorplate 50A includes a roof portion, and may also have elements that include ventilation systems, maintenance systems, and other systems that may be found on a building roof, without limitation.

The vertical support core 10 is formed from multiple vertical load-bearing column members 20, cross-members, and outer shear walls. The vertical support core 10 is designed to carry the vertical loads of the structure 100. As such, the shape of the vertical support core 10 may be designed as necessary to provide the compressive strength, shear strength, and bending strength that is necessary for the particular application, size, and location of the structure 100. The vertical support core 10 may also include a plurality of horizontal roof beams 14 that are arranged on a top portion 13.

The vertical load-bearing column members 20 are formed from steel beams, e.g., I-beams, C-beams, T-beams, L-beams, square beams, rectangular beams, etc., which define respective cross-sectional shapes.

The outer shear walls of the vertical support core 10 are formed from a hardenable material. The hardenable material may include, but is not limited to, a concrete mixture or other similar composition. The hardenable material may include one or more additives to enhance one or more physical characteristics of the hardenable material, such as to reduce curing time, reduce slump, increase strength, etc. The specific type and contents of the hardenable material may be dependent upon the specific application of the structure 100, and may be dependent upon the specific geographic region in which the structure 100 is being constructed. The specific type and contents of the hardenable material are understood by those skilled in the art, and are not described in detail herein.

Additional elements of the lift system 80 and lift bridle 30 are illustrated with reference to FIGS. 2, et seq.

Each of plurality of the floorplates 50 may be assembled onto the lift bridle 30 when it is placed at an assembly level 25 that is at or proximal to ground elevation.

The lift system 80 includes, in one embodiment, a strand jack system having a plurality of lift jacks 88 (shown with reference to FIG. 2), a plurality of static cable bundles 84, a plurality of strand mounting brackets 200. The static cable bundles 84 are suspended from the strand mounting brackets 200. The lift jacks 88 are suspended from the static cable bundles 84. The lift jacks 88 are operative to ascend the respective static cable bundle 84, thus lifting the lift bridle 30 with the floorplate 50 fabricated thereon to the respective design level 15. The floorplate 50 is then secured to the vertical support core 10. The lift jacks 88 are operative to descend on the static cable bundles 84 and thus permit the lift bridle 30 to return to the assembly level 25 for further actions, such as assembly of a subsequent floorplate.

As illustrated with reference to FIG. 2, each static cable bundle 84 is composed as one or a plurality of structural wire rope cables that are arranged in parallel. Each static cable bundle 84 has a first end 85 that is removably attachable to a strand anchor 86, and a second, opposite end 87 that is coupled to one of the lift jacks 88. The lift jacks 88 are attached to the bridle 30.

Referring again to FIGS. 1A, 1B, 1C and 1D, each of the floorplates 50 is lifted to its respective design elevation 15 employing the floorplate lifting system 60, the bridle 30, and the lift system 80. In operation, the plurality of lift jacks 88 are controlled to vertically ascend the plurality of static cable bundles 84 that are suspended from the plurality of strand mounting brackets 200, thus lifting the bridle 30 and the respective floorplate 50 assembled thereon. The plurality of strand mounting brackets 200 may be detachably affixed to the column members 20 of the vertical support core 10 at preselected attachment points, e.g., attachment points 201, 202, 203, and 204 that are illustrated with reference to FIGS. 1A, 1B, 1C and 1D, in one embodiment.

The quantity and arrangement of the preselected attachment points are application-specific, and depend upon the specific building design and configuration.

During building fabrication, the strand mounting brackets 200 are affixed to the column members 20 of the vertical support core 10. Initially, i.e., during assembly of the roof and the topmost floors, the strand mounting brackets 200 are affixed to the column members 20 of the vertical support core 10 at the top portion 13. The roof and the topmost floors are sequentially fabricated, lifted into place using the floorplate lifting system 60, and affixed to the vertical support core 10, with the lift system 80 being suspended from the strand mounting brackets 200. When the roof and the topmost floorplates have been fabricated and lifted into place and affixed to the vertical support core 10, the strand mounting brackets 200 are detached from attachment point 201 on the vertical support core 10 at the top portion 13, and are moved to the second attachment point 202 and attached to vertical support core 10. Another set of intermediate floorplates are sequentially fabricated, lifted into place using the lift system 80, and affixed to the vertical support core 10 with the strand mounting brackets 200 being affixed to the vertical support core 10 at the second attachment point 202. When the next set of intermediate floorplates have been fabricated and lifted into place and affixed to the vertical support core 10, the strand mounting brackets 200 are detached from the vertical support core 10 and moved to the third attachment point 203, which is below the first set of intermediate floors but above the design level of the next succeeding floor. This process repeats itself for a quantity of n elevation levels, and sets of intermediate floorplates until the structure is fully assembled. Other details related to this process are described and illustrated with reference to FIGS. 1A, 1B, 1C and 1D.

FIG. 1A schematically illustrates an embodiment of the multi-story structure 100 during fabrication, including the vertical support core 10, vertical load-bearing column members 20, a first of the floorplates 50A affixed to the vertical support core 10 at its design level 15, and a second of the floorplates 50B that is in the process of being hoisted towards its design level by the lift system 80. The illustrated elements of the lift system 80 include the plurality of strand mounting brackets 200 and the plurality of static cable bundles 84, which are attached via lift jacks (illustrated with reference to FIG. 2) to the lift bridle 30. In this embodiment, the plurality of strand mounting brackets 200 are detachably affixed to the vertical load-bearing column members 20 at a first attachment point 201 that is arranged at a first vertical distance from the base 12, which is at the top portion 13 of the vertical support core 10. The floorplates 50A and 50B have strand apertures 52, which are openings in the respective floorplate through which the plurality of static cable bundles 84 pass.

Figure 1B:
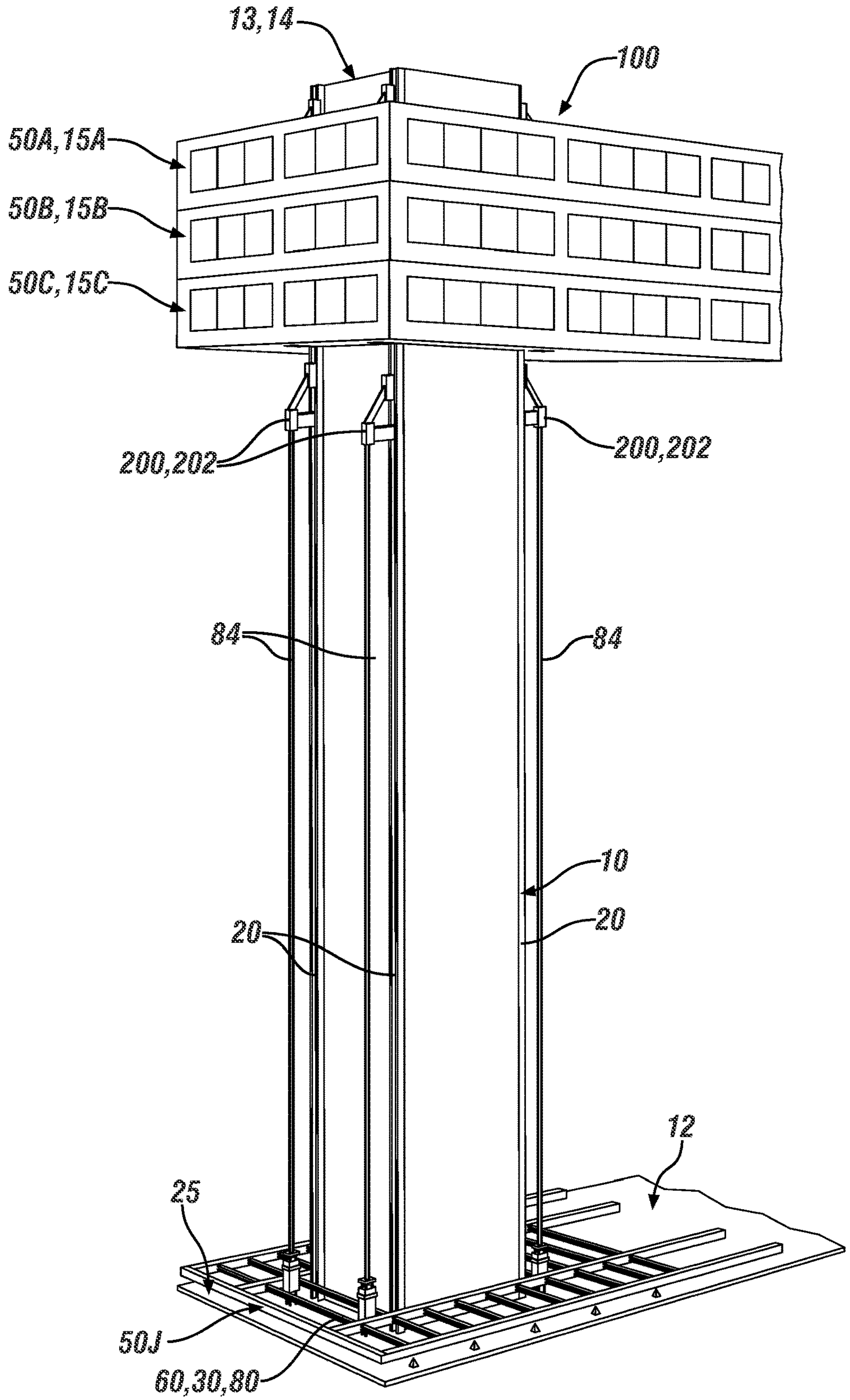

FIG. 1B schematically illustrates an embodiment of the multi-story structure 100 during fabrication, including the vertical support core 10, vertical load-bearing column members 20, and a plurality of floorplates, including first, second and third floorplates 50A, 50B, and 50C, respectively, which are affixed to the vertical support core 10 at their respective design levels 15A, 15B, 15C, respectively. A fourth partially assembled floorplate 50D is illustrated at the assembly level 25.

The illustrated elements of the lift system 80 includes the plurality of strand mounting brackets 200 and the plurality of static cable bundles 84, which are attached via lift jacks 88 to the lift bridle 30. In this embodiment, the plurality of strand mounting brackets 200 are relocated from the first attachment point 201 to a second attachment point 202 that is arranged at a second vertical distance from the base 12, which is at a first intermediate elevation between the top portion 13 of the vertical support core 10 and the base 12. The plurality of strand mounting brackets 200 are detachably affixed to the vertical load-bearing column members 20 at the second attachment point 202. The plurality of strand mounting brackets 200 and the plurality of static cable bundles 84 are removed from the first attachment point 201 at the topmost lift elevation and repositioned on the vertical load-bearing column members 20 at the second vertical distance 202 from the base 12. The lower portions of the plurality of static cable bundles 84 are trimmed therefrom, and are discarded or recycled. This trimming of the lower portions of the plurality of static cable bundles 84 is done to reduce effects of stress-induced wear, and to improve ability to handle the plurality of static cable bundles 84 during successive relocations of the plurality of strand mounting brackets 200 during fabrication.

Figure 1C:
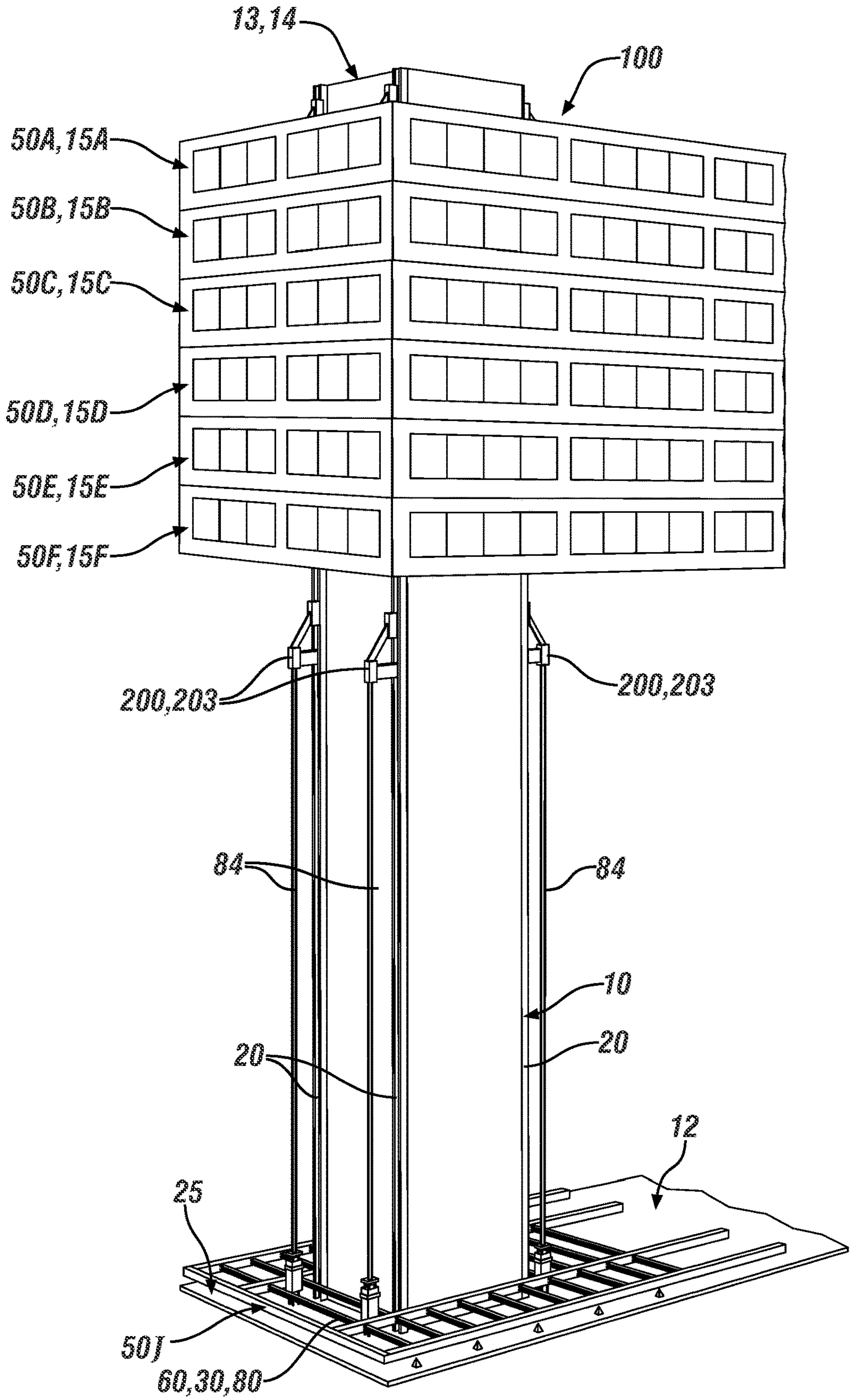

FIG. 1C schematically illustrates an embodiment of the multi-story structure 100 during fabrication, including the vertical support core 10, vertical load-bearing column members 20, and a plurality of floorplates, including first, second, third, fourth, fifth, and sixth floorplates 50A, 50B, 50C, 50D, 50E, and 50F respectively, which are affixed to the vertical support core 10 at their respective design levels 15A, 15B, 15C, 15D, 15E, and 15F respectively. A seventh partially assembled floorplate 50G is illustrated at the assembly level 25.

The illustrated elements of the lift system 80 includes the plurality of strand mounting brackets 200 and the plurality of static cable bundles 84, which are attached via lift jacks 88 to the lift bridle 30. In this embodiment, the plurality of strand mounting brackets 200 are relocated from the second attachment point 202 to a third attachment point 203 that is arranged at a third vertical distance from the base 12, which is at a second intermediate elevation between the top portion 13 of the vertical support core 10 and the base 12. The plurality of strand mounting brackets 200 are detachably affixed to the vertical load-bearing column members 20 at the third attachment point 203. The plurality of strand mounting brackets 200 and the plurality of static cable bundles 84 are removed and repositioned on the vertical load-bearing column members 20 at the third vertical distance 203 from the base 12. Again, the lower portions of the plurality of static cable bundles 84 are trimmed therefrom, and discarded or recycled.

Figure 1D:
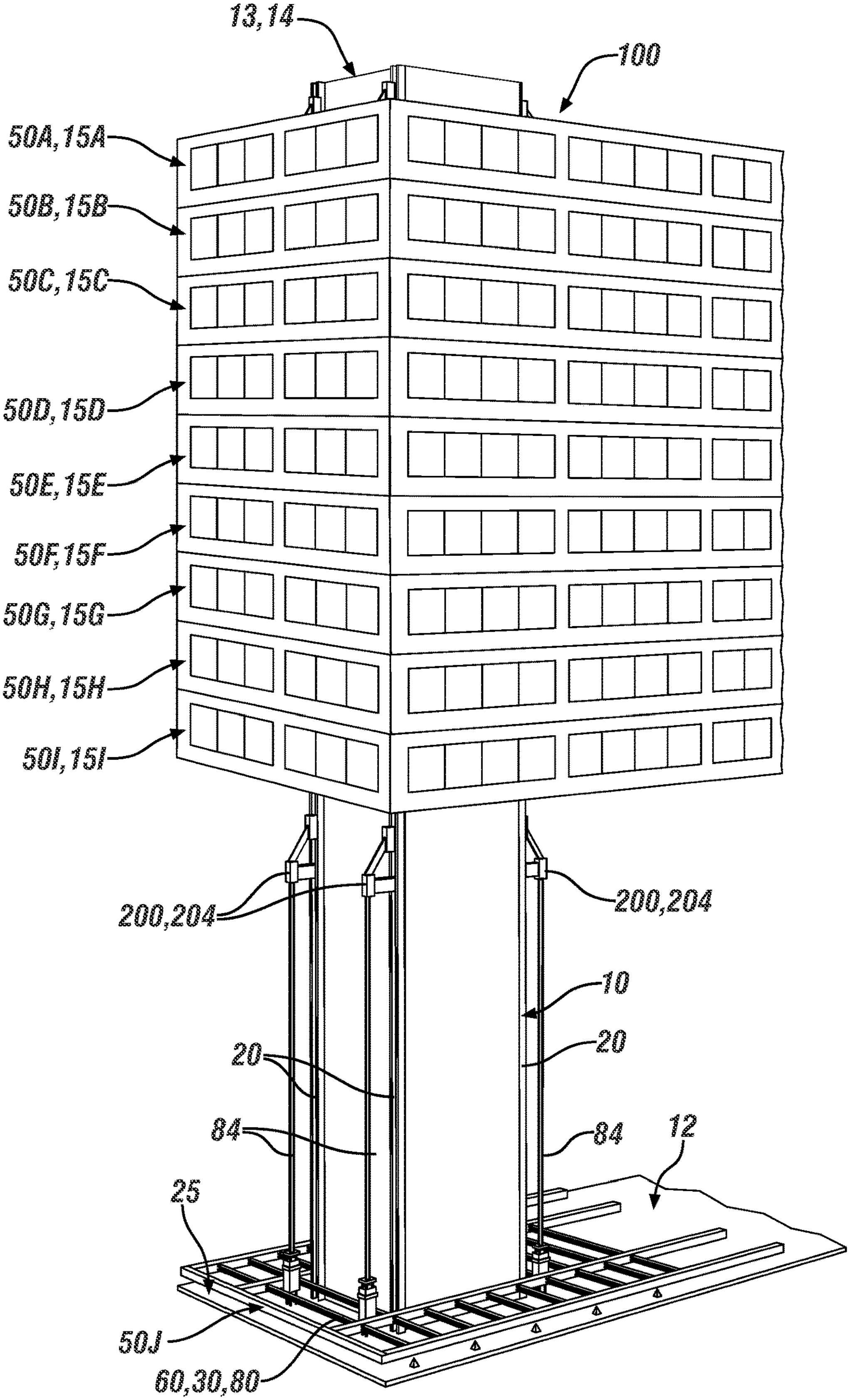

FIG. 1D schematically illustrates an embodiment of the multi-story structure 100 during fabrication, including the vertical support core 10, vertical load-bearing column members 20, and a plurality of floorplates, including first, second, third, fourth, fifth, sixth, seventh, eighth, and ninth floorplates 50A, 50B, 50C, 50D, 50E, 50F, 50G, 50H, and 50I, respectively, which are affixed to the vertical support core 10 at their respective design levels 15A, 15B, 15C, 15D, 15E, 15F, 15G, 15H, and 15I, respectively. A partially assembled floorplate 50J is illustrated at the assembly level 25.

The illustrated elements of the lift system 80 includes the plurality of strand mounting brackets 200 and the plurality of static cable bundles 84, which are attached via lift jacks 88 to the lift bridle 30. In this embodiment, the plurality of strand mounting brackets 200 are relocated from the third attachment point 203 to a fourth attachment point 204 that is arranged at a fourth vertical distance from the base 12, which is at a third intermediate elevation between the top portion 13 of the vertical support core 10 and the base 12. The plurality of strand mounting brackets 200 are detachably affixed to the vertical load-bearing column members 20 at the fourth attachment point 204. The plurality of strand mounting brackets 200 and the plurality of static cable bundles 84 are removed and repositioned on the vertical load-bearing column members 20 at the fourth vertical distance 204 from the base 12. Again, the lower portions of the plurality of static cable bundles 84 are trimmed therefrom, and discarded or recycled.

Each of the floorplates 50A, et seq. have strand apertures 52, which are openings in the respective floorplate through which the plurality of static cable bundles 84 pass. The strand apertures 52 are closed off and eliminated when the plurality of static cable bundles 84 and the plurality of strand mounting brackets 200 are removed.

The strand mounting brackets 200 are detachably affixed to the vertical columns 20 of the vertical support core 10 at or near the top portion 13. The strand mounting brackets 200 are elements of the lift system 80, which is employable by the floorplate lifting system 60 to hoist one of the floorplates 50 that has been assembled onto the lift bridle 30. The lift system 80 includes, in one embodiment, a strand jack system having a plurality of lift jacks 88, a plurality of static cable bundles 84, a plurality of strand mounting brackets 200.

In one embodiment, and as shown, there is one of the strand mounting brackets 200 associated with one of the lift jacks 88 of the bridle 30, and associated static cable bundles 84 and lockable joints 20. The concepts described herein provide a multi-story structure that includes a vertical support core and a plurality of cantilevered floorplates, wherein fabrication of the structure includes assembling each of the floorplates at or near ground level, and lifting each of the floorplates to a design elevation on the vertical support core. This includes a structure assembly system for fabricating an embodiment of the multi-story structure having a vertical support core arranged on a base. Lift jacks are arranged between a top portion and a bottom portion of the vertical support core, and a reusable bridle is suspended from the plurality of lift jacks and slidably arranged on the vertical support core. A floorplate is assembled onto the bridle at an assembly level that is proximal to the base. The plurality of the lift jacks are operable to lift the bridle and the assembled floorplate to a design elevation on the vertical support core, and are operable to lower the bridle to the assembly level on the vertical support core after the floorplate has been secured to the vertical support core at the design elevation.

Figure 2:
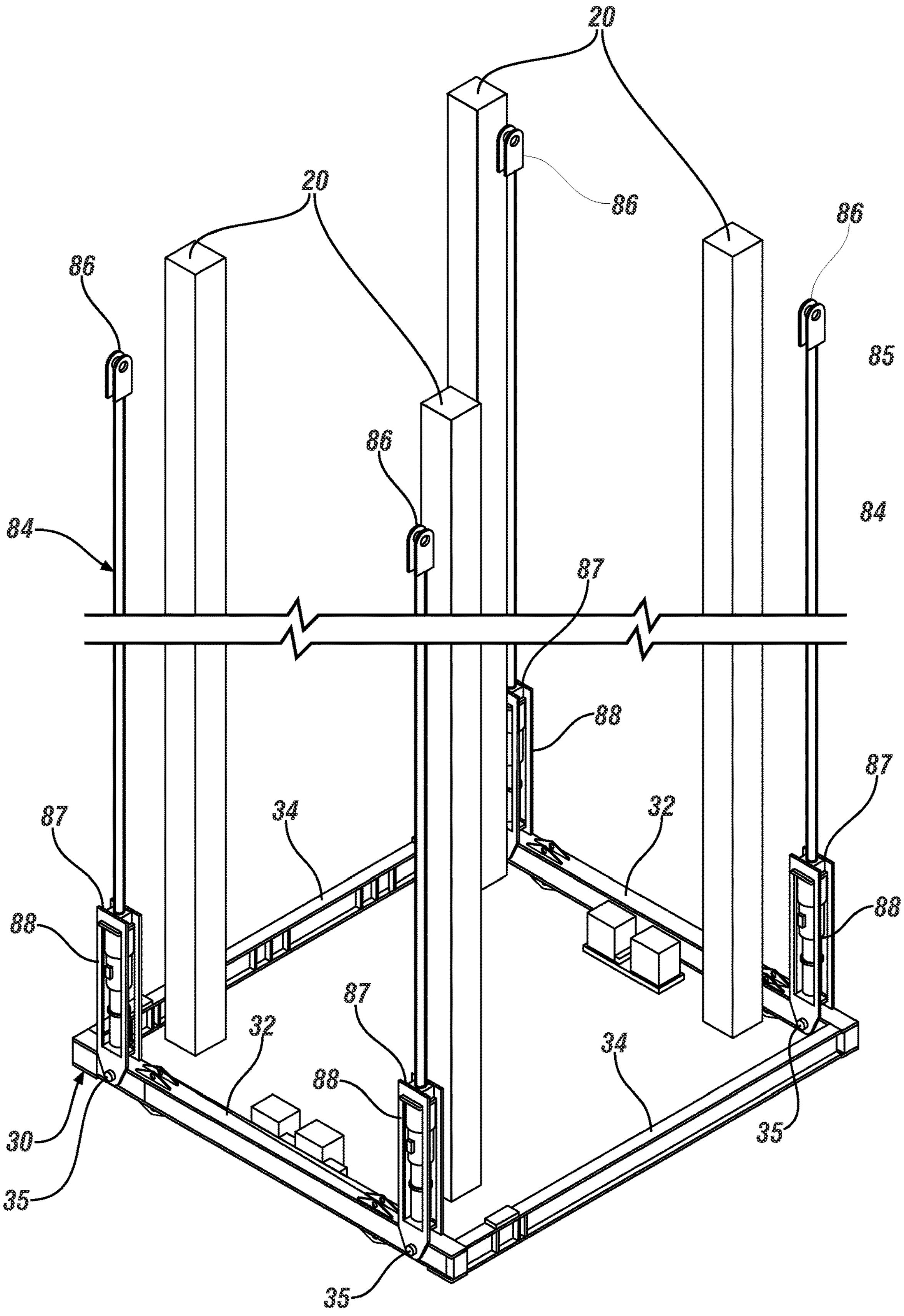
FIG. 2 schematically illustrates an isometric view of elements of the building fabrication system that includes the lift bridle and the lift system, in accordance with the disclosure.
Figure 3:
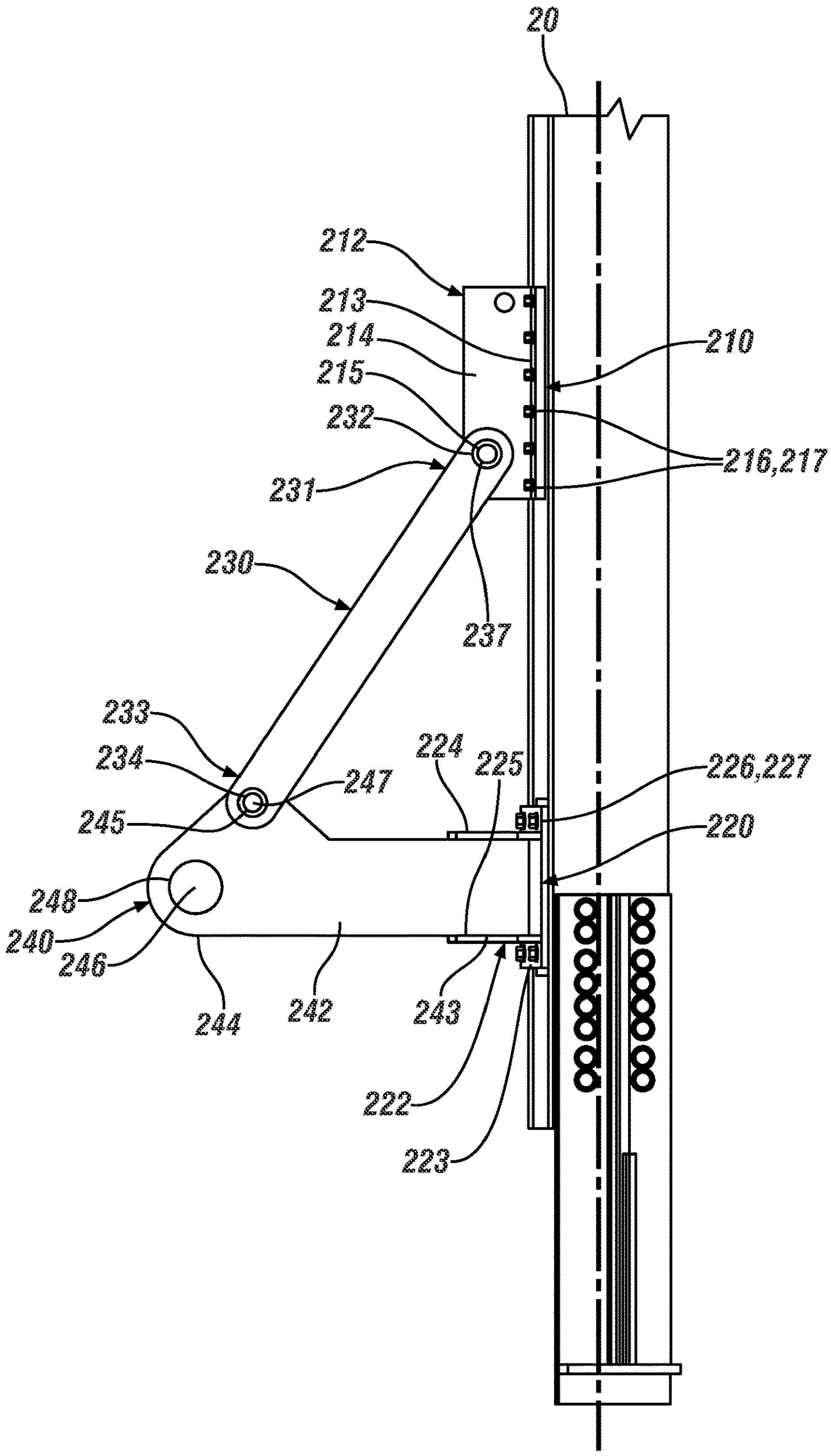
FIG. 3 schematically illustrates a side view of an embodiment of one of the strand mounting brackets that is detachably affixed to a vertical load-bearing column member of a vertical support core, in accordance with the disclosure.
Figure 4:
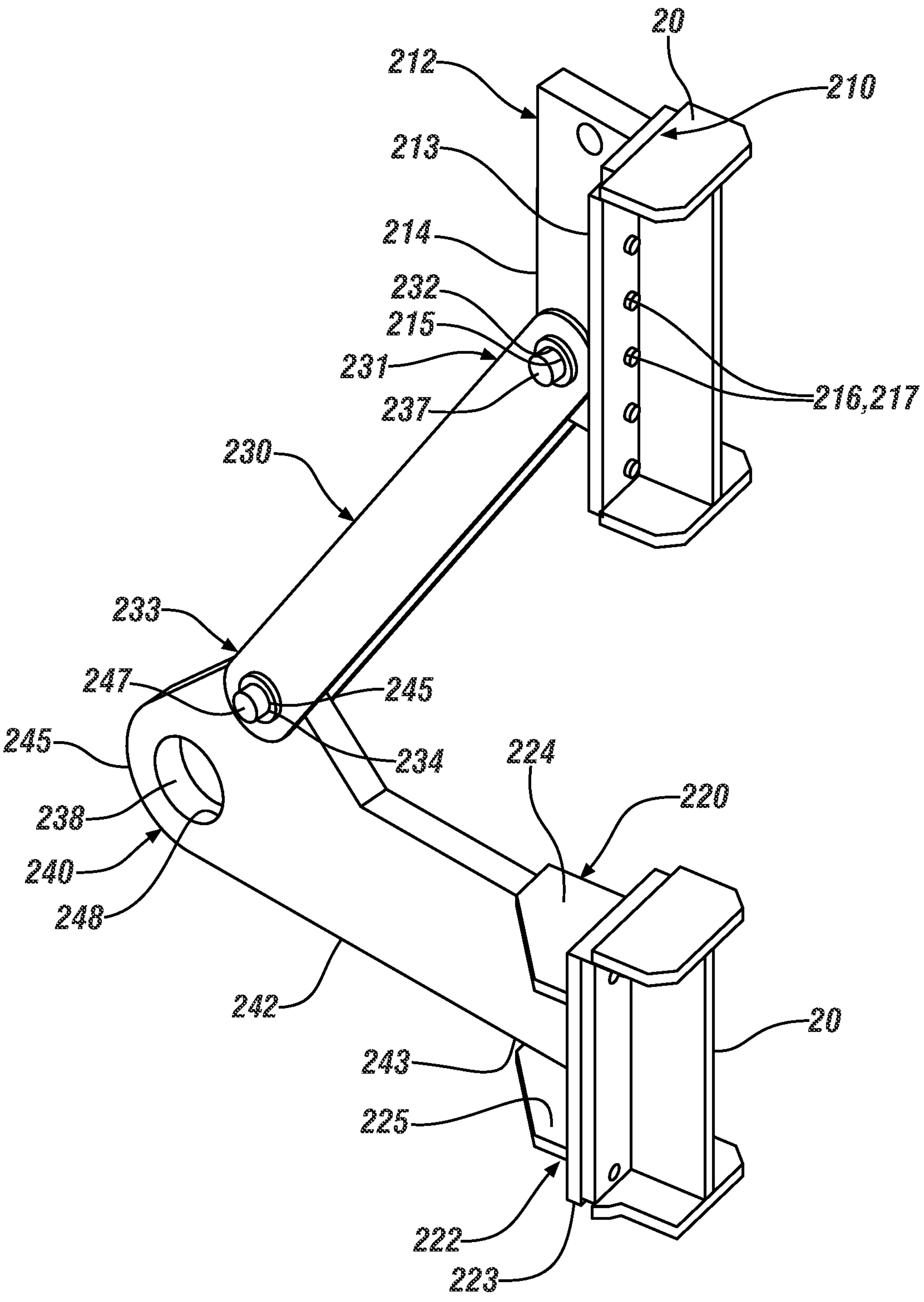
FIG. 4 schematically illustrates a three-dimensional isometric view of an embodiment of one of the strand mounting brackets, in accordance with the disclosure.
Figure 5:
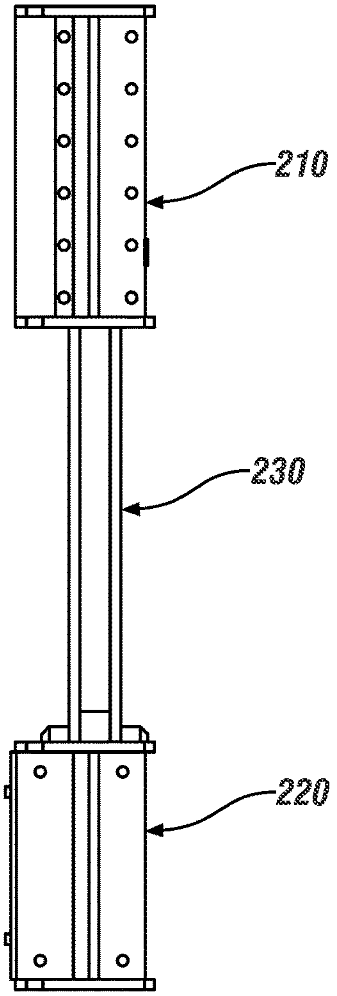
FIG. 5 schematically illustrates a back view of an embodiment of one of the strand mounting brackets.
Figure 6:
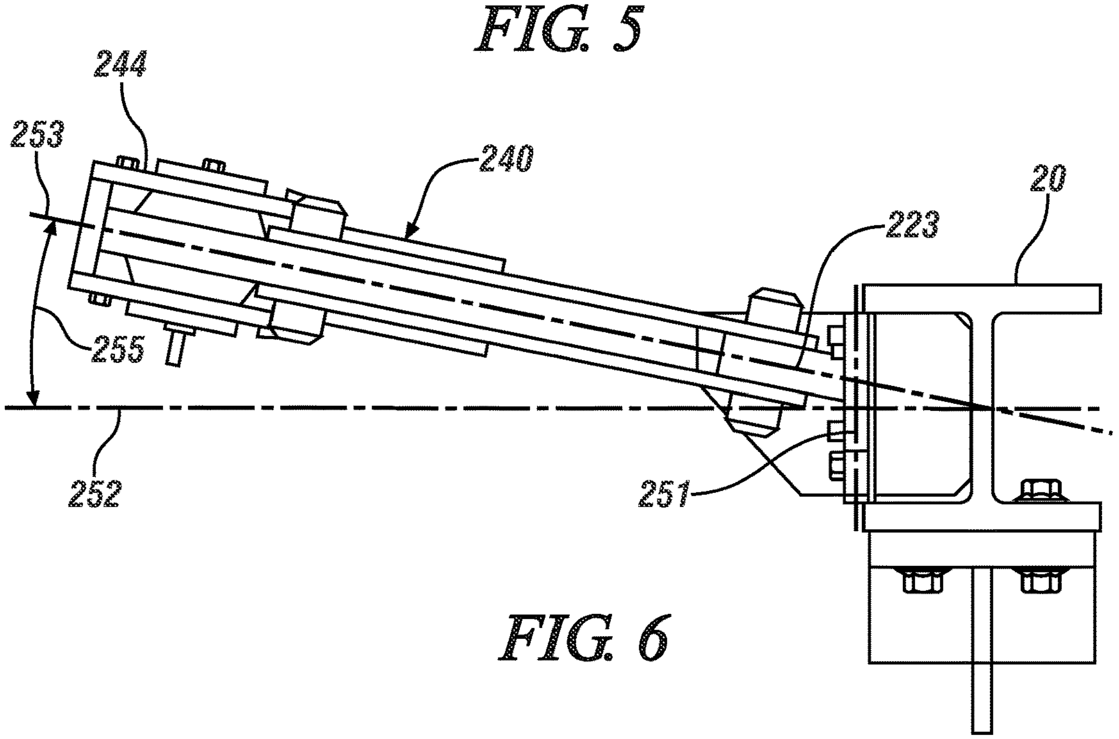
FIG. 6 schematically illustrates a top view of an embodiment of one of the strand mounting brackets that is detachably affixed to a vertical load-bearing column member, in accordance with the disclosure.

FIG. 2 schematically illustrates an embodiment of the floorplate lifting system 60 including an embodiment of the lift bridle 30 and the lift system 80. Elements of the vertical support core 10 are arranged on the base 12. Elements of the vertical support core 10 include a plurality of the vertical columns 20, which are arranged on corners thereof. The bridle 30 includes lifting beams 32 and side beams 34 that are arranged around the outer periphery of the vertical support core 10. The lifting beams 32 are attached to and suspended from the lift jacks 88. When the vertical support core 10 has a rectangular cross-section, e.g., as shown, a first of the lifting beams 32 is suspended from a first set of the lift jacks 88 on a first side of the vertical support core 10, and a second of the lifting beams 32 is suspended from a second set of the lift jacks 88 on a second side of the vertical support core 10 that is opposite to the first side. A first of the side beams 34 is arranged on a first end of the vertical support core 10 and is affixed to first ends of the lifting beams 32. A second of the side beams 34 is arranged on a second, opposite end of the vertical support core 10 and is affixed to second ends of the lifting beams 32. The side beams 34 and the lifting beams 32 are arranged such that upper surfaces of the opposed lifting beams 32 are level with upper surfaces of the opposed side beams 34 in a horizontal plane. A plurality of bearing pads are assembled onto the first and second side beams 34 for placement of girders of the floorplates 50 during assembly. Alternatively, the plurality of bearing pads may be assembled onto the first and second lifting beams 32 for placement of the girders of the floorplates 50 during assembly.

The floorplates 50 make up discrete sections of the structure 100. Each of the floorplates 50 is assembled at the assembly level 25, which is advantageously a few feet above ground level on top of the bridle 30. Each of the floorplates 50 is lifted to its design elevation 15 employing the lift jacks 88 or other vertical conveyance structure(s), and permanently affixed to and supported by the vertical support core 10. The floorplates 50 are cantilevered from the lift jacks 88 and therefore, the weight of each of the floorplates 50 is distributed symmetrically around the vertical support core 10 and the lift jacks 88. The floorplates 50 may be designed asymmetrically around the lift jacks 88 so long as proper design and loading techniques are utilized.

The bridle 30 is assembled around an outer periphery of the vertical support core 10 and is removably attachable to and suspended from the lift jacks 88 via the static cable bundles 84. The bridle 30 is a reusable device that may be employed to support each floorplate 50 during assembly at the assembly level 25. The bridle 30 is also used to support each floorplate 50 when the respective floorplate 50 is being lifted by the lift jacks 88 and secured to its respective design elevation 15. The bridle 30 is lowered by the lift jacks 88 to the assembly level 25 after the respective floorplate 50 is secured to its respective design elevation 15. The bridle 30 is then re-used to support another of the floorplates 50 during assembly. The bridle 30 is supported on a plurality of stub columns that are arranged on the base 12 around the outer periphery of the vertical support core 10 when it is at the assembly level 25 proximal to the ground elevation. The bridle 30 is disassembled and removed from the vertical support core 10 after the liftable floorplates have been fabricated and lifted into place at their respective design levels.

The lift jacks 88 may be employed to grasp the static cable bundles 84 to lift heavy objects. The specific features and operation of lift jacks 88 such as strand jacks are known to those skilled in the art.

FIGS. 3, 4, 5, and 6 illustrate various elements and perspectives of an embodiment of the strand mounting bracket 200, which may be detachably affixed to one of the column members 20 of the vertical support core 10 as described with reference to FIG. 1.

The strand mounting bracket 200 includes an upper mounting portion 210, a lower mounting portion 220, one or two diagonal member(s) 230, and a horizontal strut 240. The upper mounting portion 210, lower mounting portion 220, diagonal member(s) 230, and horizontal strut 240 may be fabricated from steel, or other material having tensile strength and/or compressive strength that is capable of handling loads induced during building fabrication. Design elements, e.g., material strengths, dimensions, thicknesses, etc., are application-specific, and are selected based upon expected loads. floorplate The upper mounting portion 210 and the lower mounting portion 220 are detachably affixed to one of the column members 20 of the vertical support core 10. In one embodiment, each of the column members 20 is an I-beam, with the upper mounting portion 210 and the lower mounting portion 220 being detachably affixed to a web portion of the I-beam via corresponding apertures formed therein. Alternatively, the column member 20 is an I-beam with a bridge element attached between opposed flanges of the I-beam at a mounting location for the strand mounting bracket 200, and the upper mounting portion 210 and the lower mounting portion 220 are detachably affixed to the bridge element via corresponding apertures formed therein.

The upper mounting portion 210 is arranged as a T-beam 212 having a first flange portion 213 and a vertically oriented web portion 214. Thus, the web portion 214 defines an axis that is parallel to a longitudinal axis of the respective column member 20 of the vertical support core 10 when assembled thereon. A first attachment aperture 215 is formed in the web portion 214, preferably in a lower portion thereof when assembled onto the column member 20. The first flange portion 213 has a plurality of first fastener apertures 216, which are capable of accommodating a plurality of securement fasteners 217 that detachably affix the upper mounting portion 210 to the respective column member 20 via corresponding apertures formed therein.

The lower mounting portion 220 is configured as a horizontally oriented double T-beam 222 having a second flange portion 223 and first and second horizontal web portions 224, 225, respectively. The second flange portion 223 defines a plurality of second apertures 226 capable of accommodating a plurality of securement fasteners 227. The second flange portion 223 is securable to the column member 20 employing the plurality of securement fasteners 227 disposed in the plurality of second apertures 226, via corresponding apertures formed therein.

The horizontal strut 240 includes an elongated bar 242 having a first end 243 and a second end 244. The first end 243 is disposed between the first and second horizontal web portions 224, 225 of the lower mounting portion 220 and abuts the second flange portion 223, and is fused thereto, via welding. The second end 244 defines a second attachment aperture 245 and a strand anchor attachment point 246.

The strand anchor 86 of the static cable bundle 84 is suspended from the strand mounting bracket 200 at the strand anchor attachment point 246 via a third pin 248 when in use. The third pin 248 is removable to disconnect the strand anchor 86 of the static cable bundle 84 from the strand mounting bracket 200 when the strand mounting bracket 200 is being repositioned.

The second end 244 of the horizontal strut 240 projects outwardly from the second flange portion 223 at an angle 255 that is non-orthogonal to a vertically-oriented plane 251 that is defined by the second flange portion 223. Stated differently, the vertically-oriented plane 251 is defined by the second flange portion 223 of the lower mounting portion 220, and first vector 252 projects orthogonal therefrom. Second vector 253 is defined by a longitudinal axis of the horizontal strut 240, and angle 255 is defined between the first vector 252 and the second vector 253. The angle 255 is determined such that the strand anchor attachment point 246 on the second end 244 of the horizontal strut 240 is positioned directly overhead of the lift points 35 of the lifting beams 32 of the bridle 30 so that no twist or torsion or other horizontal force or movement of the floorplate 50 is induced during floorplate lifting due to a difference between the second end 244 of the horizontal strut 240 and the respective lift point 35. Stated differently, the strand anchor attachment point 246 of the second end 244 of the horizontal strut 240 is positioned such that the static cable bundle 84 that is suspended from the strand anchor attachment point 246 is precisely vertical when the respective lift jack 88 is attached to the lift point 35 of the bridle 30.

Each diagonal member 230 (two are illustrated) is an elongated steel bar having a first end 231 defining and having a first diagonal aperture 232, and a second end 233 defining and having a second diagonal aperture 234. The first end 231 of the diagonal member 230 is joined to the upper mounting portion 210 via a first pin 237 that is inserted in the first attachment aperture 215 and the first diagonal aperture 232. The second end 233 of the diagonal member 230 is joined to the lower mounting portion 220 via a second pin 247 that is inserted in the second diagonal aperture 234 and the second attachment aperture 245 of the horizontal strut 240.

In configurations employing multiple vertical support cores, paired lifting brackets may be moved in alternating fashion to facilitate fabrication and lifting. By way of example, paired lifting brackets on a first of the vertical support cores may be moved after a first lift event, with corresponding lifting brackets on a second of the vertical support cores remaining in place. After a second, subsequent lifting event, paired lifting brackets on second of the vertical support cores may be moved after the second lift event, with corresponding lifting brackets on the first of the vertical support cores remaining in place. Preferably, the paired lifting brackets and associated lift points are arranged in line with a common shear wall of the vertical support core to maintain symmetrical compression along paired boundary elements.

The following Clauses provide example configurations of a floorplate lifting system, as disclosed herein.

Clause 1: A floorplate lifting system, comprising: a lift bridle; and a lift system, including: a plurality of strand jacks, a plurality of static strand bundles, a plurality of strand anchors, and a plurality of strand mounting brackets;

wherein the plurality of strand mounting brackets are attachable to a vertical support core arranged on a base;

wherein first ends of the plurality of static strand bundles are removably attachable to the plurality of strand anchors;

wherein the plurality of static strand bundles are suspended from the plurality of strand mounting brackets via the plurality of strand anchors;

wherein second ends of the plurality of static strand bundles are arranged on the plurality of strand jacks; and wherein the plurality of strand jacks are attached to the lift bridle.

Clause 2: The floorplate lifting system of clause 1, wherein each of the plurality of strand mounting brackets comprises:

an upper mounting portion, a lower mounting portion, a diagonal member, and a horizontally disposed strut;

the upper mounting portion including a vertically oriented T-beam having a first flange portion and a vertical web portion, wherein the web portion defines a first attachment aperture;

the lower mounting portion including a horizontally oriented double T-beam having a second flange portion and first and second horizontal web portions;

the strut being a first elongated bar having a first end and a second end, wherein the second end defines a second attachment aperture and a strand anchor attachment point, and wherein the first end is secured to the lower mounting portion;

the diagonal member being a second elongated bar having a first end and a second end, wherein the first end is secured to the first attachment aperture of the upper mounting portion, and wherein the second end is secured to the second attachment aperture of the lower mounting portion; and wherein the strut is arranged between the first and second horizontal web portions of the lower mounting portion and is attached to the second flange portion of the lower mounting portion.

Clause 3: The floorplate lifting system of any of clauses 1-2, wherein the strut projects from the lower mounting portion at an angle that is non-orthogonal to a vertically-oriented plane defined by the second flange portion of the lower mounting portion.

Clause 4: The floorplate lifting system of any of clauses 1-3, wherein the first flange portion of the upper mounting portion defines a plurality of first apertures capable of accommodating a plurality of securement fasteners.

Clause 5: The floorplate lifting system of any of clauses 1-4, wherein the first flange portion of the upper mounting portion is detachably affixed to the vertical support core employing the plurality of securement fasteners disposed in the plurality of first apertures.

Clause 6: The floorplate lifting system of any of clauses 1-5, wherein the second flange portion of the lower mounting portion defines a plurality of second apertures for accommodating a plurality of securement fasteners.

Clause 7: The floorplate lifting system of any of clauses 1-6, wherein the second flange portion of the lower mounting portion is detachably affixed to the vertical support core employing the plurality of securement fasteners disposed in the plurality of second apertures.

Clause 8: The floorplate lifting system of any of clauses 1-7, wherein the vertical support core comprises a plurality of vertical columns that are arranged on a base, and wherein the plurality of vertical columns include a plurality of attachment points that are arranged on the plurality of vertical columns that project upwardly from the base.

Clause 9: The floorplate lifting system of any of clauses 1-8, wherein the plurality of strand mounting brackets are attachable to the plurality of vertical columns at one of the plurality of attachment points that are arranged on the plurality of vertical columns that project upwardly from the base.

Clause 10: The floorplate lifting system of any of clauses 1-9, wherein the plurality of attachment points that are arranged on the plurality of vertical columns that project upwardly from the base comprises:

a first attachment point arranged at a top portion of each of the plurality of vertical columns of the vertical support core;

a second attachment point arranged at a first intermediate portion of each of the plurality of vertical columns of the vertical support core; and a third attachment point arranged at a second intermediate portion of each of the plurality of vertical columns of the vertical support core.

Clause 11: The floorplate lifting system of any of clauses 1-10, wherein the lift bridle is slidably disposed on the vertical support core.

Clause 12: The floorplate lifting system of any of clauses 1-12, wherein a floorplate is assembled onto the lift bridle; and wherein the floorplate is lifted into place on the vertical support core by actions of the plurality of strand jacks arranged on the plurality of static strand bundles.

Clause 13: A strand mounting bracket for a lift system, comprising: an upper mounting portion, a lower mounting portion, a diagonal member, and a strut;

the upper mounting portion including a vertically oriented T-beam having a first flange portion and a vertical web portion, wherein the web portion defines a first attachment aperture;

the lower mounting portion including a horizontally oriented double T-beam having a second flange portion and first and second horizontal web portions;

the strut being a first elongated bar having a first end and a second end, wherein the second end defines a second attachment aperture and a strand anchor attachment point, and wherein the first end is secured to the lower mounting portion;

the diagonal member being second elongated bar having a first end and a second end, wherein the first end is secured to the upper mounting portion via the first attachment aperture, and wherein the second end is secured to lower mounting portion via the second attachment aperture; and wherein the strut is arranged between the first and second horizontal web portions of the lower mounting portion and is attached to the second flange portion of the lower mounting portion.

Clause 14: The strand mounting bracket of clause 13, wherein the strut projects from the lower mounting portion at an angle that is non-orthogonal to a vertically-oriented plane defined by the second flange portion of the lower mounting portion.

Clause 15: The strand mounting bracket of any of clauses 1-14, wherein the strut comprises a horizontal member.

Clause 16: The strand mounting bracket of any of clauses 1-15, wherein the first flange portion of the upper mounting portion defines a plurality of first apertures capable of accommodating a plurality of securement fasteners.

Clause 17: The strand mounting bracket of any of clauses 1-16, wherein the first flange portion of the upper mounting portion is securable to a vertical column employing the plurality of securement fasteners arranged in the plurality of first apertures.

Clause 18: The strand mounting bracket of any of clauses 1-17, wherein the second flange portion of the lower mounting portion defines a plurality of second apertures capable of accommodating a plurality of securement fasteners; and wherein the second flange portion of the lower mounting portion is securable to a vertical column employing the plurality of securement fasteners disposed in the plurality of second apertures.

Clause 19: A building fabrication system, comprising:

a lift bridle arranged on a vertical support core having a plurality of vertical columns disposed on a base; and a lift system, including:
a plurality of strand jacks,
a plurality of static strand bundles,
a plurality of strand anchors, and
a plurality of strand mounting brackets;
wherein the plurality of strand mounting brackets are attachable to the plurality of vertical columns;
wherein the plurality of static strand bundles includes first ends and second ends;
wherein the first ends of the plurality of static strand bundles are removably attachable to the plurality of strand anchors;
wherein the plurality of static strand bundles are suspended from the plurality of strand mounting brackets via the plurality of strand anchors;
wherein the second ends of the plurality of static strand bundles are arranged on the plurality of strand jacks; and
wherein the plurality of strand jacks are attached to the lift bridle,
wherein a floorplate is assemblable on the lift bridle at a ground level;
wherein the lift system is operable to lift the lift bridle on the plurality of static strand bundles to hoist the floorplate to a design level; and
wherein the lift system is operable to drop the lift bridle the plurality of static strand bundles after the floorplate is secured to the vertical support core at the design level by operation of the strand jacks on the static strand bundles.

Clause 20: The building fabrication system of clause 19, wherein the plurality of strand mounting brackets are attachable to the plurality of vertical columns at one of a plurality of attachment points that are arranged along the plurality of vertical columns that project upwardly from the base, wherein the plurality of attachment points comprises:
a first attachment point arranged at top portions of the plurality of vertical columns of the vertical support core;
a second attachment point arranged at a first intermediate portion of each of the plurality of vertical columns of the vertical support core; and
a third attachment point arranged at a second intermediate portion of each of the plurality of vertical columns of the vertical support core.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A strand mounting bracket for a lift system, comprising:
an upper mounting portion, a lower mounting portion, a diagonal member, and a strut;
the upper mounting portion including a vertically oriented T-beam having a first flange portion and a vertical web portion, wherein the web portion defines a first attachment aperture;
the lower mounting portion including a horizontally oriented double T-beam having a second flange portion and first and second horizontal web portions;
the strut being a first elongated bar having a first end and a second end, wherein the second end defines a second attachment aperture and a strand anchor attachment point, and wherein the first end is secured to the lower mounting portion;
the diagonal member being second elongated bar having a first end and a second end, wherein the first end is secured to the upper mounting portion via the first attachment aperture, and wherein the second end is secured to lower mounting portion via the second attachment aperture; and
wherein the strut is arranged between the first and second horizontal web portions of the lower mounting portion and is attached to the second flange portion of the lower mounting portion.

2. The strand mounting bracket of claim 1, wherein the strut projects from the lower mounting portion at an angle that is non-orthogonal to a vertically-oriented plane defined by the second flange portion of the lower mounting portion.

3. The strand mounting bracket of claim 1, wherein the strut comprises a horizontal member.

4. The strand mounting bracket of claim 1, wherein the second flange portion of the lower mounting portion defines a plurality of second apertures capable of accommodating a plurality of securement fasteners; and wherein the second flange portion of the lower mounting portion is securable to a vertical column employing the plurality of securement fasteners disposed in the plurality of second apertures.

5. The strand mounting bracket of claim 1, wherein the first flange portion of the upper mounting portion defines a plurality of first apertures capable of accommodating a plurality of securement fasteners.

6. The strand mounting bracket of claim 5, wherein the first flange portion of the upper mounting portion is securable to a vertical column employing the plurality of securement fasteners arranged in the plurality of first apertures.

7. A floorplate lifting system, comprising:
a lift bridle; and
a lift system, including:
a plurality of strand jacks,
a plurality of static strand bundles,
a plurality of strand anchors, and
a plurality of strand mounting brackets;
wherein the plurality of strand mounting brackets are detachably affixed to a vertical support core arranged on a base;
wherein first ends of the plurality of static strand bundles are removably attachable to the plurality of strand anchors;
wherein the plurality of static strand bundles are suspended from the plurality of strand mounting brackets via the plurality of strand anchors;
wherein the plurality of strand jacks are suspended from second ends of the plurality of static strand bundles;
wherein the plurality of strand jacks are attached to the lift bridle; and
wherein the lift bridle is slidably disposed on the vertical support core.

8. The floorplate lifting system of claim 7,
wherein a floorplate is assembled onto the lift bridle; and
wherein the floorplate is lifted into place on the vertical support core by actions of the plurality of strand jacks suspended from the plurality of static strand bundles.

9. The floorplate lifting system of claim 7, wherein the vertical support core comprises a plurality of vertical columns that are arranged on the base, and wherein the plurality of vertical columns include a plurality of attachment points that are arranged on the plurality of vertical columns that project upwardly from the base.

10. The floorplate lifting system of claim 9, wherein the plurality of strand mounting brackets are attachable to the plurality of vertical columns at one of the plurality of attachment points that are arranged on the plurality of vertical columns that project upwardly from the base.

11. The floorplate lifting system of claim 9, wherein the plurality of attachment points that are arranged on the plurality of vertical columns that project upwardly from the base comprises:

a first attachment point arranged at a top portion of each of the plurality of vertical columns of the vertical support core;

a second attachment point arranged at a first intermediate portion of each of the plurality of vertical columns of the vertical support core; and a third attachment point arranged at a second intermediate portion of each of the plurality of vertical columns of the vertical support core.

12. The floorplate lifting system of claim 7, wherein each of the plurality of strand mounting brackets comprises:

an upper mounting portion, a lower mounting portion, a diagonal member, and a horizontally disposed strut;

the upper mounting portion including a vertically oriented T-beam having a first flange portion and a vertical web portion, wherein the web portion defines a first attachment aperture;

the lower mounting portion including a horizontally oriented double T-beam having a second flange portion and first and second horizontal web portions;

the strut being a first elongated bar having a first end and a second end, wherein the second end defines a second attachment aperture and a strand anchor attachment point, and wherein the first end is secured to the lower mounting portion;

the diagonal member being a second elongated bar having a first end and a second end, wherein the first end is secured to the first attachment aperture of the upper mounting portion, and wherein the second end is secured to the second attachment aperture of the lower mounting portion; and wherein the strut is arranged between the first and second horizontal web portions of the lower mounting portion and is attached to the second flange portion of the lower mounting portion.

13. The floorplate lifting system of claim 12, wherein the strut projects from the lower mounting portion at an angle that is non-orthogonal to a vertically-oriented plane defined by the second flange portion of the lower mounting portion.

14. The floorplate lifting system of claim 12, wherein the first flange portion of the upper mounting portion defines a plurality of first apertures capable of accommodating a plurality of securement fasteners.

15. The floorplate lifting system of claim 14, wherein the first flange portion of the upper mounting portion is detachably affixed to the vertical support core employing the plurality of securement fasteners disposed in the plurality of first apertures.

16. The floorplate lifting system of claim 12, wherein the second flange portion of the lower mounting portion defines a plurality of second apertures for accommodating a plurality of securement fasteners.

17. The floorplate lifting system of claim 16, wherein the second flange portion of the lower mounting portion is detachably affixed to the vertical support core employing the plurality of securement fasteners disposed in the plurality of second apertures.

18. A building fabrication system, comprising:

a lift bridle slidably arranged on a vertical support core having a plurality of vertical columns disposed on a base; and a lift system, including:

a plurality of strand jacks, a plurality of static strand bundles, a plurality of strand anchors, and a plurality of strand mounting brackets;

wherein the plurality of strand mounting brackets are attachable to the plurality of vertical columns;

wherein the plurality of static strand bundles includes first ends and second ends;

wherein the first ends of the plurality of static strand bundles are removably attachable to the plurality of strand anchors;

wherein the plurality of static strand bundles are suspended from the plurality of strand mounting brackets via the plurality of strand anchors;

wherein the plurality of strand jacks are suspended from second ends of the plurality of static strand bundles;

wherein the plurality of strand jacks are attached to the lift bridle;

wherein a floorplate is assemblable on the lift bridle at a ground level;

wherein the lift system is operable to lift the lift bridle on the plurality of static strand bundles to hoist the floorplate to a design level; and wherein the lift system is operable to drop the lift bridle the plurality of static strand bundles after the floorplate is secured to the vertical support core at the design level by operation of the strand jacks on the static strand bundles.

19. The building fabrication system of claim 18, wherein the plurality of strand mounting brackets are attachable to the plurality of vertical columns at one of a plurality of attachment points that are arranged along the plurality of vertical columns that project upwardly from the base, wherein the plurality of attachment points comprises:

a first attachment point arranged at top portions of the plurality of vertical columns of the vertical support core;

a second attachment point arranged at a first intermediate portion of each of the plurality of vertical columns of the vertical support core; and a third attachment point arranged at a second intermediate portion of each of the plurality of vertical columns of the vertical support core.

* * * * *